Sept. 24, 1929.  J. B. ELFRING  1,729,286
ADJUSTABLE SPACING COLLAR FOR MILLING CUTTERS
Filed April 11, 1925
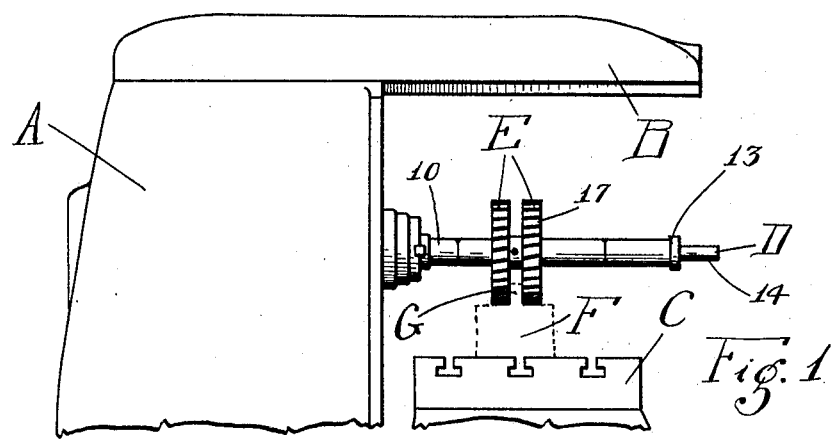
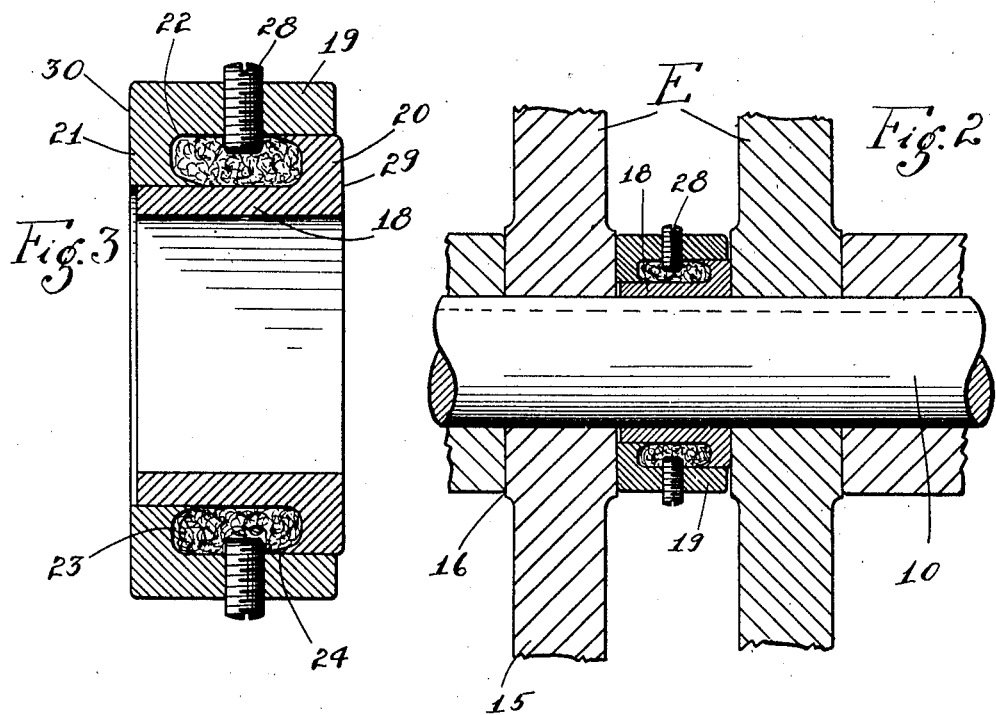
Inventor
John Elfring
By A. K. Parsons
Attorney Patented Sept. 24, 1929

1,729,286

UNITED STATES PATENT OFFICE

JOHN B. ELFRING, OF CINCINNATI, OHIO, ASSIGNOR TO THE CINCINNATI MILLING MACHINE COMPANY, OF CINCINNATI, OHIO, A CORPORATION OF OHIO

ADJUSTABLE SPACING COLLAR FOR MILLING CUTTERS

Application filed April 11, 1925. Serial No. 22,323.

This invention relates to improvements in milling machinery and more particularly to the manner of mounting gang cutters or the like on the spindle or arbor of such machines.

In milling operations it is frequently desirable to mount two or more cutters on the spindle for simultaneous operation to remove desired stock from the work piece at laterally spaced points. Frequently such cutters are used for forming slots or the like of such nature that the clearance or spacing between the cutters must be very accurately determined.

The ordinary method of mounting such cutters is to make use of a series of suitable spacing collars mounted on the spindle at each side of and intermediate the several cutters to secure this relationship. Such collars must be very accurately formed so that when the series is tightened there will be no springing of the spindle out of proper line and no disturbance of the relative positions of the cutters. This relative positioning of the cutters is frequently difficult to accurately accomplish and in the past it has been customary to attain the desired spacing either by forming an individual collar of exact correct dimensions in each instance or to form the collar as nearly to proper dimensions relative the cutter hubs as possible and then fill in the additional spacing required, if any, dependent upon the exact width of the cutter teeth, etc. by the use of a thin shim or the like. This has a disadvantage of requiring taking down of the entire cutter assembly for any additional shimming up of the parts, decrease in width of the collar or the like.

It is therefore the purpose of the present invention to provide an extremely simple, durable and efficient spacing collar whose effective width may be accurately varied to within a fractional thousandth of an inch if desired and which will thus facilitate most accurate relative positioning of the cutter members without disassembling of the spindle and parts mounted thereon when performing such adjustment. Other objects and advantages of the present construction should be readily apparent by reference to the following specification taken in connection with the accompanying drawings, and it will be understood that I may make any modifications in the specific details of construction hereinafter described within the scope of the appended claims without departing from or exceeding the spirit of the invention.

Fig. 1 is a fragmentary view of a milling machine with my improvement applied thereto.

Fig. 2 is a sectional view through the cutters and spacing member.

Fig. 3 is an enlarged sectional view of the adjustable spacing collar, and

Fig. 4 is a fragmentary sectional view illustrating a slightly modified construction.

In the drawings the letter A designates the column of a milling machine provided with the customary overarm B, and work supporting table C. Projecting forwardly from the column A intermediate overarm B and table C is the cutter spindle D suitably driven and serving to support the milling or cutting tools E. These tools are shown as operating upon the work F indicated in dotted lines but spaced just sufficiently to leave the intermediate fin or rib G cut on the work while performing the milling at both sides thereof.

It is to be understood that the customary mounting of cutters of this type is by the use of suitable spacing collars 10 disposed on the spindle D between the head portion 11 thereof and the cutters and between cutters and the locknut 13 which may be tightened on the thread end 14 of the spindle to secure the support parts in position thereon. The cutters 6, it will be noted, include the web or body portions 15 and the suitably faced opposed hubs 16. Peripherally, the webbed portions are formed with the cutting teeth 17 which perform the actual stock removal. It is frequently of prime importance in milling or like operations such as indicated in Fig. 1 to determine the space between the inner cutting edge of the teeth 17 of the two cutters E with extreme accuracy and precision so that rib or portion G will be of exact desired width to within .001" or less. As there are always possible slight variations in the relation of the edge of the cutting teeth to the face of the hub 16 it is difficult to secure exact desired spacing with rigid or nonadjustable intermediate spacing collars. To care for this difficulty and permit of exact spacing adjustment between the cutters, I have provided the improved spacing collar here illustrated comprising the pair of telescoping sleeve like members 18 and 19 held in spaced relation by the oppositely extending annular flange portions 20 and 21 respectively. It will be noted that the exterior diameter of the peripheral flange 20 on member 18 is such as to exactly fit the bore of sleeve portion 19 while similarly the interior diameter of the inwardly extending flange 21 on member 19 is such as to closely fit the exterior of sleeve 18. The two flanges together thus form an intermediate entirely enclosed annular chamber 22. This chamber may be filled with beeswax or other non-compressible viscous material or fluid 23. The interfitting of the two sleeves and flanges are such as to make a fluid tight joint between the parts and prevent escape thereof. The sealing of the joints may be assisted by forming the flanges with the reversely extending knife edge portions 24 which are thus sufficiently thin and flexible that any pressure applied to the contained fluid will spring the portion 24 into biting contact with the adjacent member and absolutely seal the sliding joint. In the event that it is not desired to depend entirely upon the spring of the metal of the device for this purpose, use may be made of an auxillary flap-like portion 25 of suitable fabric or metallic material which on account of its extreme flexibility will force itself into and against the joint between the parts and thus increase the sealing action and eliminate any possible loss of the contained fluid.

The adjustment of the device just described is accomplished by forming one or more threaded apertures 27 in the outer sleeve 19 to receive the pressure screws 28. It will be understood that tightening of these screws will apply pressure to the contained material 23. As the material itself is relatively incompressible there must therefore be some yielding of the device. On account of said pressure this yielding will be in the form of a lateral expansion of the chamber 22 causing relative lateral displacement of the contact faces 29 and 30 of the members 18 and 19 respectively. As the compression exerted by the tightening of a single screw must be taken up throughout the entire chamber 22 it will be understood that exceedingly fine adjustments of the overall width or space between faces 29 and 30 may be made. The range of the device and its ease of adjustment may of course be increased by the use of a plurality of pressure screws 28 as illustrated; these serving to most uniformly and rapidly distribute equalized pressure throughout the chamber 22.

From the foregoing it will be seen that I have provided a simple and efficient adjustable spacing collar for use in connection with milling cutters or the like which may be readily adjusted to secure extremely fine terminal variations and which in addition may be adjusted as desired without disassembling the several parts of the cutter spindle so that slight changes in relative spacing of the cutters for example may be made by simply loosening the ordinary retaining clamp nut and taking up on the collar pressure screws the desired amount.

I claim:

1. The combination with a milling machine cutter spindle, of a spacing collar for use in conjunction therewith, comprising an inner sleeve member fitting the spindle and having an outwardly directed flange, a second telescoping sleeve member having a flange riding on the first sleeve and having its body portion riding on the flange of the first sleeve, whereby an annular enclosed chamber is provided between the overlapping portions of the sleeve terminally closed by the flanges thereof, a non-compressible fluid within said chamber, and a mechanical means carried by one of the sleeve members and projectable within the chamber to displace the contained fluid and produce lateral variation of the telescoping relation of the sleeves substantially as described.

2. A spacing collar of the character described, including a pair of telescoping members jointly enclosing a chamber, a distortable non-compressible spacing material disposed within the chamber, and means for mechanically distorting said material to vary the axial displacement of said telescoping members, substantially as and for the purpose described.

3. A spacing collar of the character described, including a pair of spaced telescoping sleeve members having oppositely disposed flanged portions forming a chamber therebetween, a noncompressible fluid within the chamber, and means carried by one of the sleeve members and shiftable with respect thereto for applying pressure to the fluid to produce expansion of the chamber.

4. A device of the character described, including a sleeve portion having an outwardly direct peripheral flange, second sleeve member enclosing the first in spaced relation thereto and having a portion interlocking with said flange, said second sleeve member having an inwardly directed annular flange interfitting with the periphery of the first sleeve whereby a chamber is provided between the flanges of the two sleeve members, means on said flanges for sealing the joint between the respective flange and adjacent sleeve, a pressure transmitting medium contained within the chamber and means for varying the pressure applied to said medium.

5. A self-contained expansible collar for milling machine cutter spindle, including a pair of telescoping sleeve members having spacing flanges providing a central enclosed chamber, a spacing material between the sleeves and in engagement with the flanges for controlling the separation of the flanges, and screw means carried by one of the sleeves and engaging the spacing material for adjusting the material to vary the separation of the flanges.

6. A device of the character described, including concentric sleeves having interfitting spaced flanges providing an intermediate chamber therebetween, said flanges terminating in flexible portions engaging the opposite members to seal the joint therebetween, a fluid contained within said chamber and means for applying pressure to the fluid to vary the lateral dimensions of the chamber, the position of the flexible portions of the flanges being such that increase of pressure increases the sealing action thereof.

JOHN B. ELFRING.